(12) United States Patent
Hardin et al.

(10) Patent No.: US 6,431,194 B1
(45) Date of Patent: Aug. 13, 2002

(54) CONDENSATE REMOVAL PROTECTION APPARATUS AND METHOD THEREFORE

(75) Inventors: John W. Hardin, Medina; Mark W. Wood, Jackson, both of TN (US)

(73) Assignee: DeVilbiss Air Power Company, Jackson, TN (US)

(*) Notice: Subject to any disclaimer, the term of this patent is extended or adjusted under 35 U.S.C. 154(b) by 0 days.

(21) Appl. No.: 09/802,328

(22) Filed: Mar. 8, 2001

Related U.S. Application Data

(60) Provisional application No. 60/187,724, filed on Mar. 8, 2000.

(51) Int. Cl.[7] .............................................. F16K 35/00
(52) U.S. Cl. ......................... 137/1; 137/203; 137/377; 137/382; 137/899.4
(58) Field of Search ................................. 137/203, 377, 137/382, 899.4, 1; 251/144

(56) References Cited

U.S. PATENT DOCUMENTS

| | | | | |
|---|---|---|---|---|
| 3,287,883 A | * | 11/1966 | Mott | 137/565.18 |
| 4,220,097 A | * | 9/1980 | Wempe et al. | 251/144 |
| 4,234,158 A | * | 11/1980 | Rollins et al. | 251/144 |
| 4,394,002 A | * | 7/1983 | Polley | 251/144 |
| 4,527,489 A | * | 7/1985 | Schlink | 251/144 |
| 4,678,159 A | * | 7/1987 | Gardner et al. | 251/144 |
| 4,697,528 A | * | 10/1987 | Rehbein et al. | 251/144 |
| 5,218,911 A | * | 6/1993 | Rehbein et al. | 251/144 |
| 5,518,032 A | * | 5/1996 | Berke | 137/899.4 |

* cited by examiner

*Primary Examiner*—Gerald A. Michalsky
(74) *Attorney, Agent, or Firm*—Suiter & Associates PC

(57) ABSTRACT

The present invention discloses an apparatus and method for protecting a condensate removal device from damage that may be caused when the condensate removal device comes into contact with foreign objects. The present invention discloses placing a shield around the condensate removal device to help prevent the condensate removal device from coming into contact with any foreign object. The present invention also discloses placing a removable cap around the condensate removal device and a condensate removal device that may recess within a mounting assembly.

22 Claims, 7 Drawing Sheets

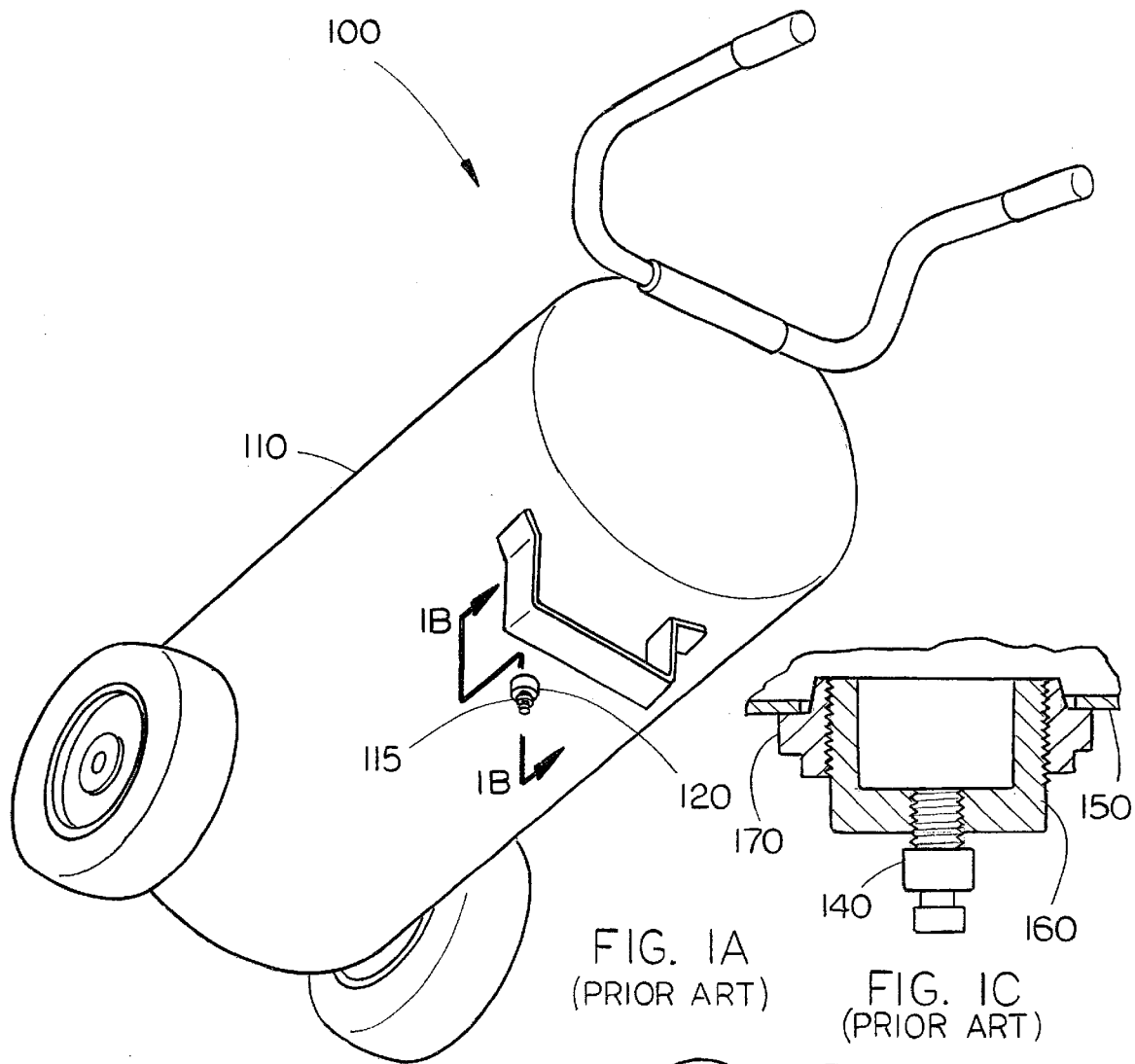
FIG. 1A
(PRIOR ART)
FIG. 1C
(PRIOR ART)
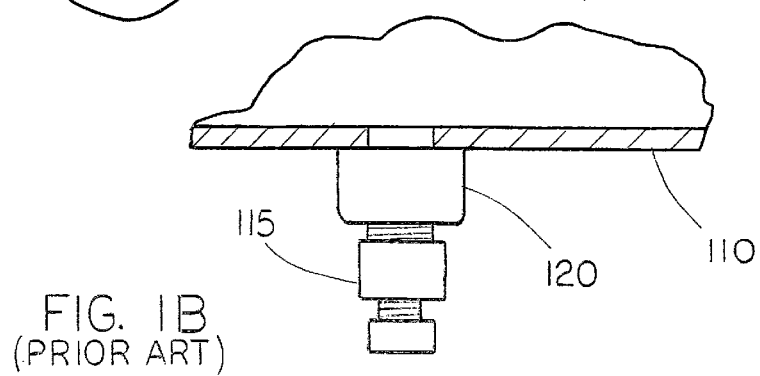
FIG. 1B
(PRIOR ART)

CONDENSATE REMOVAL PROTECTION APPARATUS AND METHOD THEREFORE

CROSS-REFERENCE TO RELATED APPLICATIONS

The present application claims benefit of 35 U.S.C. § 119(e) of U.S. Provisional Application Ser. No. 60/187,724 filed Mar. 8, 2000. Said U.S. Provisional Application Ser. No. 60/187,724 is hereby incorporated by reference in its entirety.

FIELD OF THE INVENTION

The present invention relates generally to condensate removal devices and more typically to condensate removal protection.

BACKGROUND OF THE INVENTION

Known to the art is the placement of a condensate removal device in proximity to a low point of a compressed air tank for the removal of condensate that may form within a compressed air tank. During the utilization of a compressed air tank, it is common for water and other liquids to condense from the air inside of the air tank as a consequence of the pressure and temperature differences inside the tank and outside the tank. Water and other liquids that may accumulate inside the air tank may be removed through the installation of a condensate removal device placed near a low point of the air tank. Typically, condensate removal devices known to the art are valves that may be opened and closed easily yet are capable of maintaining a constant pressure inside the air tank.

Since compressed air tanks tend to be large and heavy, they may not be easily transported. As a result, typical mobile compressed air tanks may be fitted to a frame comprising wheels and handlebars. This allows a person or persons to lift the compressed air tank and pull or push it to a desired location. While traveling on a smooth surface, the design works well. However, in many construction sites, movement to a remote location over an uneven and unpaved surface may be necessary. A frequent problem that occurs while moving the compressed air tank to a remote location is that the drain valve for removing condensate from an air tank may be damaged during transport to a remote location. Foreign objects tend to come into contact with the valve during transport causing damage to the valve. Another problem is that compressed air tanks may be moved during the day and typically are placed upon the bed of a pickup truck in order to transport the compressed air tank to another worksite. Since typical compressed air tanks are heavy, it is not easy for persons to use care and caution when placing the compressed air tanks onto the bed of a pickup truck. Thus, the compressed air tank may be lifted and pushed onto the bed in a quick manner. Often, other items located on the bed of the truck may come into contact with the drain valve damaging the valve when the compressed air tank is placed upon the bed of a pickup truck. Upon damage to the drain valve, the compressed air tank becomes non-functional.

Consequently, it would be advantageous to provide an apparatus to act as a shield to prevent the condensate removal device from coming into contact with foreign objects. Further, it would be advantageous if the condensate removal device could recess into a mounting device allowing the mounting device to shield the condensate removal device. Another advantageous aspect would be to cover the condensate removal device with a removable cap to protect the condensate removal device.

SUMMARY OF THE INVENTION

Accordingly, the present invention is directed to a novel apparatus for protecting the condensate removal device from damage caused by contact with foreign objects. The present invention is directed towards a shield that prevents objects from coming into contact with the condensate removal device. The present invention is further directed to a recessed condensate removal device where the condensate removal device may be recessed within a mounting device that to prevent damage to the condensate removal device by shielding contact from foreign objects. Further, the present invention is directed to a removable cap that may be placed around and cover the condensate removal device.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which:

FIG. 1A depicts a compressed air tank known to the art;

FIG. 1B is a side view of a compressed air tank known to the art as shown in FIG. 1A.

FIG. 1C is a detailed view of a mounting assembly known to the art;

DETAILED DESCRIPTION OF THE INVENTION

Figure 2A:
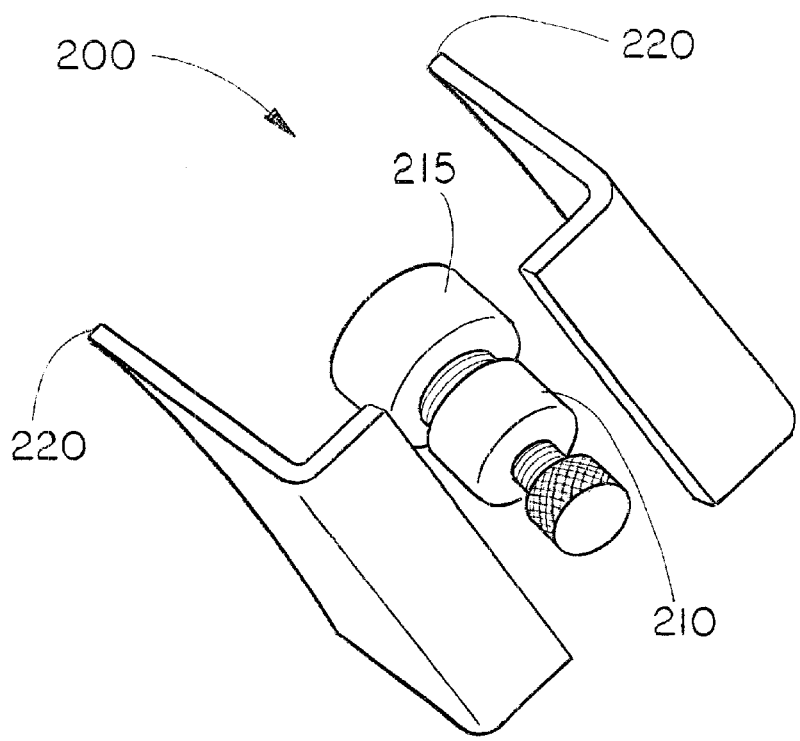
FIG. 2A depicts a view of an exemplary condensate removal protection apparatus of the present invention.

Reference will now be made in detail to the presently preferred embodiments of the invention, examples of which are illustrated in the accompanying drawings.

Referring now to FIGS. 1A 1B, an exemplary compressed air tank 100 known to the art is shown. Compressed air tanks 100 typically comprise an air tank 110 and a tank drain valve 115. A tank drain valve 115 may be connected to an air tank 110 via a mounting assembly 120. The mounting assembly may include a weld flange 170 (FIG. 1C) and a plug 160 (FIG. 1C) that is capable of being threaded within the weld flange 170 (FIG. 1C). The tank drain valve 115 may be threaded to allow the valve 115 mounted within the mounting assembly 120.

Referring specifically to FIG. 1C, a detailed view of a mounting assembly for a valve is shown. The weld flange 170 is welded to the air tank 150. A mounting device 160 may be threaded and placed within the weld flange 170. This type of mounting assembly allows for a greater opening in the tank 150 as required per ASME standards for some types of compressed air tanks 100. By removing the valve 140, an inspection of the inside of air tank 150 may be more easily accomplished. Drain valves known to the art project a great distance away from the air tank. This leaves the drain valves exposed to possible damage as a result of contact with foreign objects.

Figure 2B:
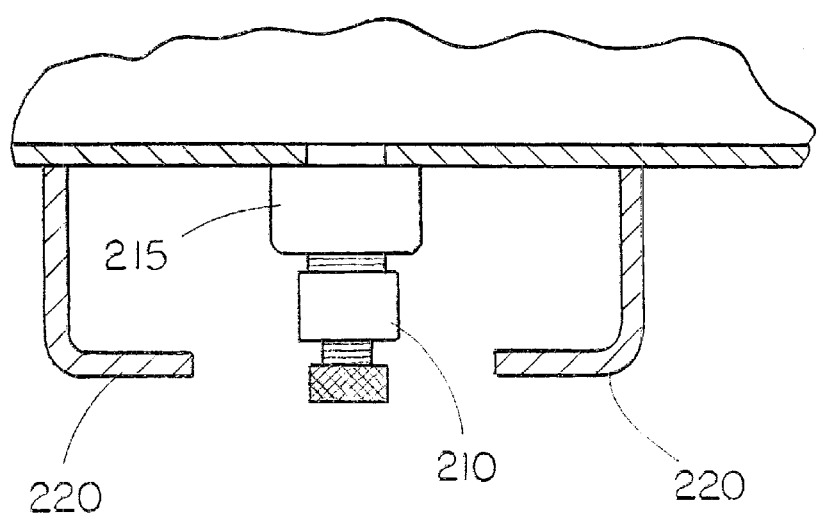
FIG. 2B is a side view of the exemplary condensate removal protection apparatus as shown in FIG. 2A.

Referring to FIGS. 2A and 2B, an exemplary embodiment 200 of a condensate removal protection apparatus of the present invention is shown. A condensate removal device may be mounted to an air tank (not shown) at a low point of the air tank in order to remove condensate from the air tank. As shown in FIGS. 2–7, the condensate removal device is a valve 210, however, the present invention is not limited to valves. Any condensate removal device that allows ease in opening and closing a removable closure and may maintain a constant pressure inside the tank when the removable closure is closed may be utilized without departing from the scope and spirit of the present invention. Further, different types of mounting assemblies may be incorporated with the present invention to a person of ordinary skill in the art and thus various types of mounting assemblies may be incorporated with the present invention without departing from the scope and spirit of the present invention. An example of a condensate removal device is a plug. A plug may be utilized yet is not recommended because it does provide the necessary ease in removing and replacing the plug when draining is necessary. Typically, manufacturers recommend that a compressed air assembly be drained at least once a day to prevent against corrosion on the inside of the air tank. Thus, ease in opening and closing the removal device is paramount. Further, different types of mounting assemblies may be incorporated with the present invention to a person of ordinary skill in the art and thus various types of mounting assemblies may be incorporated with the present invention without departing from the scope and spirit of the present invention.

Referring specifically to FIGS. 2A and 2B, in an exemplary embodiment two l-shaped support pieces 220 may be placed on opposite sides of the valve 210 to prevent the valve 210 from coming into contact with any foreign objects. The valve 210 may be connected to a mounting assembly 215 that connects the valve 210 to an air tank. The exemplary support pieces as shown in FIGS. 2–4 may be manufactured from any strong and durable material including metal, plastic, fiberglass, and wood. For ease in manufacturing, a preferred material for the support may be metal as it may be easily welded to an air tank. Foreign objects may include but are not limited to mud, dirt, rocks, tools, equipment, concrete, wood, and hose. Along with providing a shield against contact with foreign objects, the condensate removal protection apparatus 200 provides room to allow access by tools or hands in order to open and close the valve 210.

Figure 3A:
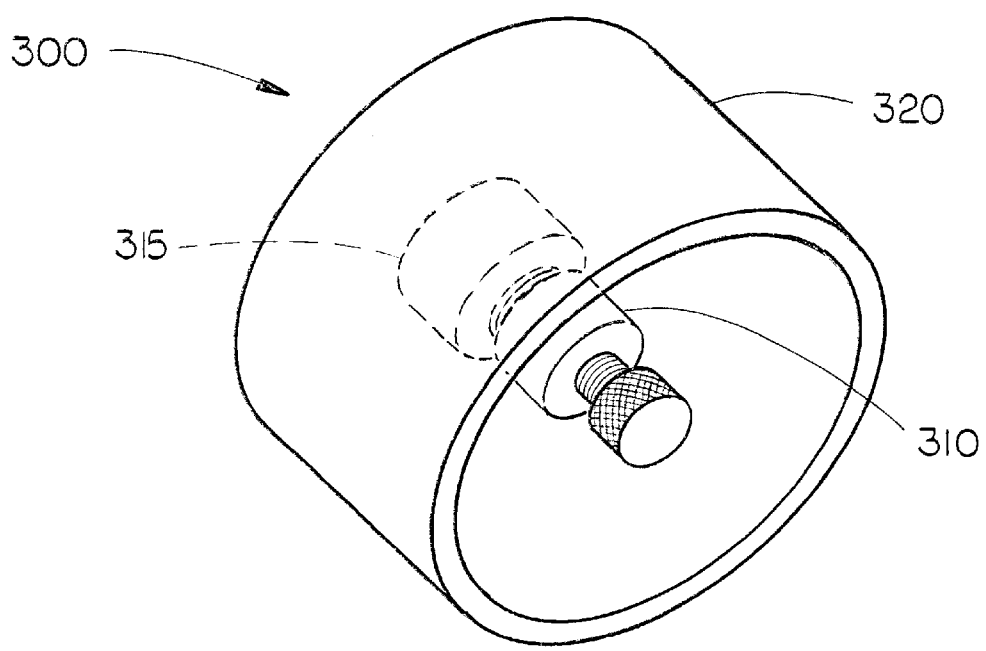
FIG. 3A depicts an alternative exemplary condensate removal protection apparatus of the present invention.
Figure 3B:
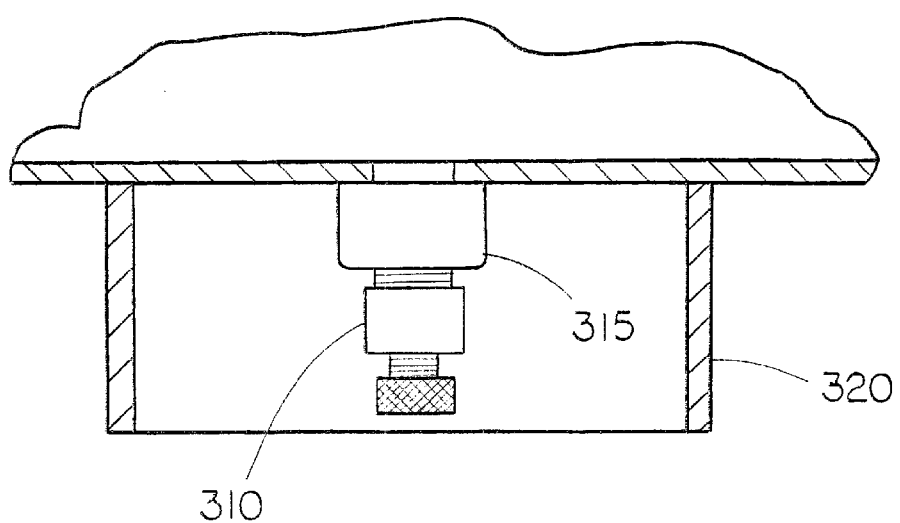
FIG. 3B is a side view of the alternative exemplary condensate removal protection apparatus as shown in FIG. 3A.

Alternate embodiments may be utilized in order to protect a condensate removal device from coming into contact with foreign objects. Referring now to FIGS. 3A and 3B, an alternative exemplary embodiment 300 of the condensate removal protection apparatus of the present invention is shown. Surrounding the valve 310 and the mounting assembly 315, a cylindrical support 320 may be mounted to an air tank. This may allow coverage on all sides of the drain valve 310 and the mounting assembly 315, however, an opening is present to allow access to the valve 310 for draining of condensate from an air tank. It should be noted that a shape that is not cylindrical that surrounds the valve including but not limited to square, rectangular, trapezoidal may be recognized and utilized by a person with ordinary skill in the art without departing from the scope and spirit of the present invention.

Figure 4A:
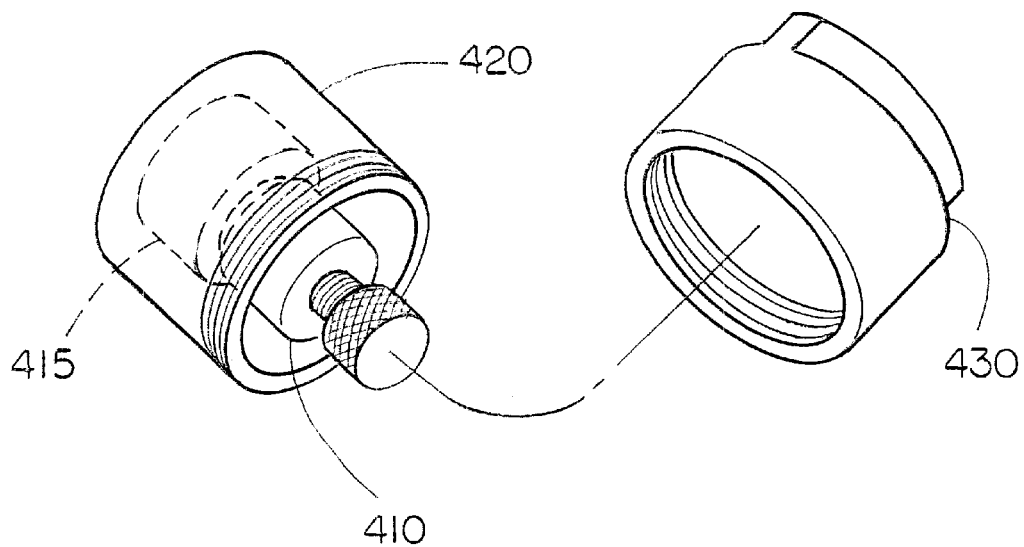
FIG. 4A depicts an exemplary condensate removal protection apparatus with full enclosure of the present invention.
Figure 4B:
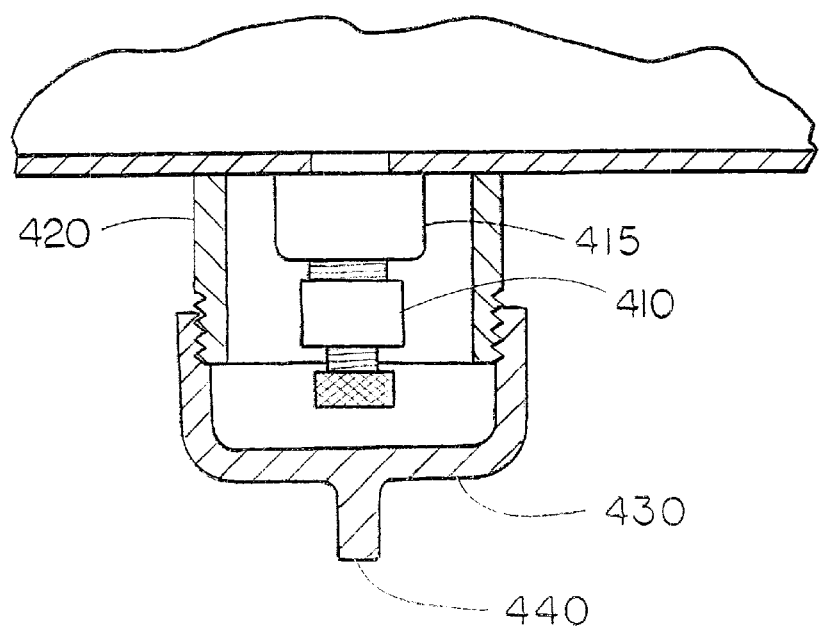
FIG. 4B is a side view of the exemplary condensate removal protection apparatus with full enclosure as shown in FIG. 4A.

Additionally, a cap may be placed on the bottom of the cylindrical support 320 to protect the valve from contact from any direction. Referring to FIGS. 4A and 4B, in an exemplary embodiment 400 a cylindrical support 420 surrounding a valve 410 and a mounting assembly 415 may be threaded to allow a cap 430 to be connected to the cylindrical support 420. The advantage of this embodiment is that the valve 410 may be completely enclosed within a protective apparatus, however, a cap 430 must be removed when draining is to take place. The cap 430 may be fitted with an extension 440 on the outer end of the cap to allow easier access to opening the cap 430. Once again, a shape that is not cylindrical and a cap formed to fit over the shape of the support may be utilized without departing from the scope and spirit of the present invention.

Figure 5A:
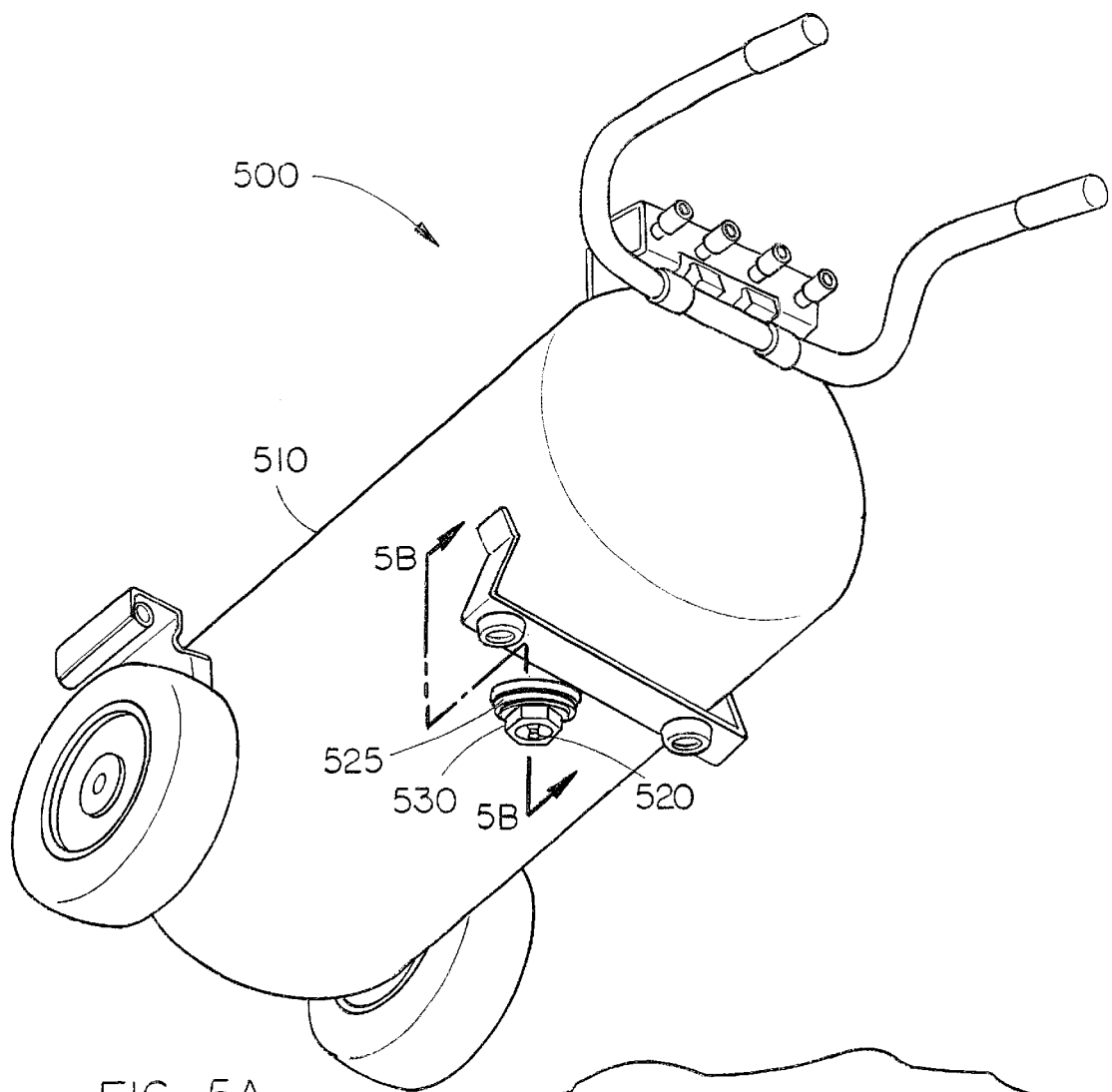
FIG. 5A depicts an exemplary recessed condensate removal device of the present invention.
Figure 5B:
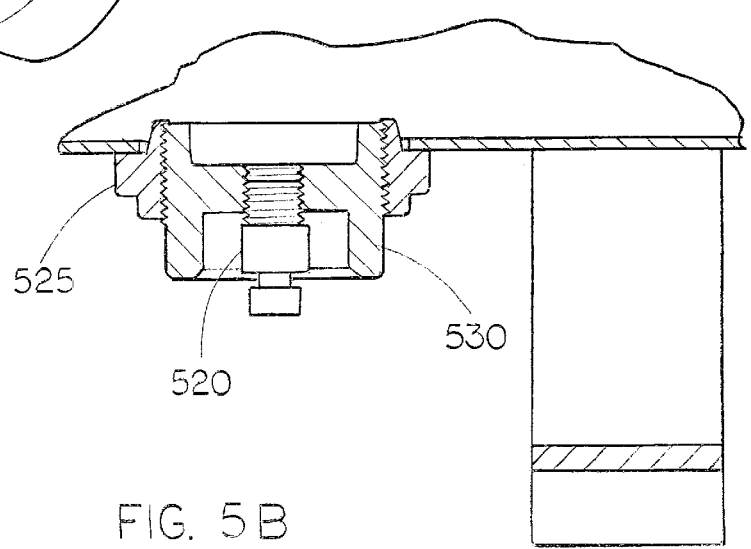
FIG. 5B is a side view of the exemplary recessed condensate removal device as shown in FIG. 5A.

Turning to an alternative way of protecting a valve from contact from foreign objects, in an exemplary embodiment 500 of the present invention a valve may be recessed within the mounting assembly as shown in FIGS. 5A and 5B. Referring specifically to FIG. 5A, an air tank 510 is shown comprising a valve 520 connected to a threaded plug 530. The plug 530 may the secured to the tank via a weld flange 525 that may be welded to an air tank 510. In this embodiment, the plug 530 may be thought of as a reducer as it covers a larger hole in the air tank 510 and reduces the hole to one that may fit the valve 520. The plug 530 provides a number of advantages. First, it provides a good seal to ensure pressurization within the air tank 510. Also, it allows for an easier inspection as dictated per ASME standards for some compressed air tanks. Further, by recessing the valve 520 within the plug 530, the valve 520 may be protected from contact with foreign objects. Yet there is enough space to allow access to the valve 520 by a user to open and close the valve 520. The plug 530 may be threaded to allow easy installation and removal from the tank via a threaded weld flange 525. As shown in FIG. 5B, the outer end of the valve 520 may protrude outside of the mounting 530. It should also be noted that protective supports as shown in FIGS. 2–4 may also be incorporated with the recessed valve embodiment to ensure greater protection from contact from foreign objects. Thus, for example, a recessed valve may be utilized in conjunction with two l-shaped supports in proximity of the valve to further protect the valve from contact with foreign objects. Also, it should be recognized that the plug 530 as shown in FIGS. 5A and 5B are exemplary only and various modifications may be made to the mounting device to allow recessing of the valve 520 within the mounting device 530 by one of ordinary skill in the art without departing from the scope and spirit of the present invention.

Figure 6:
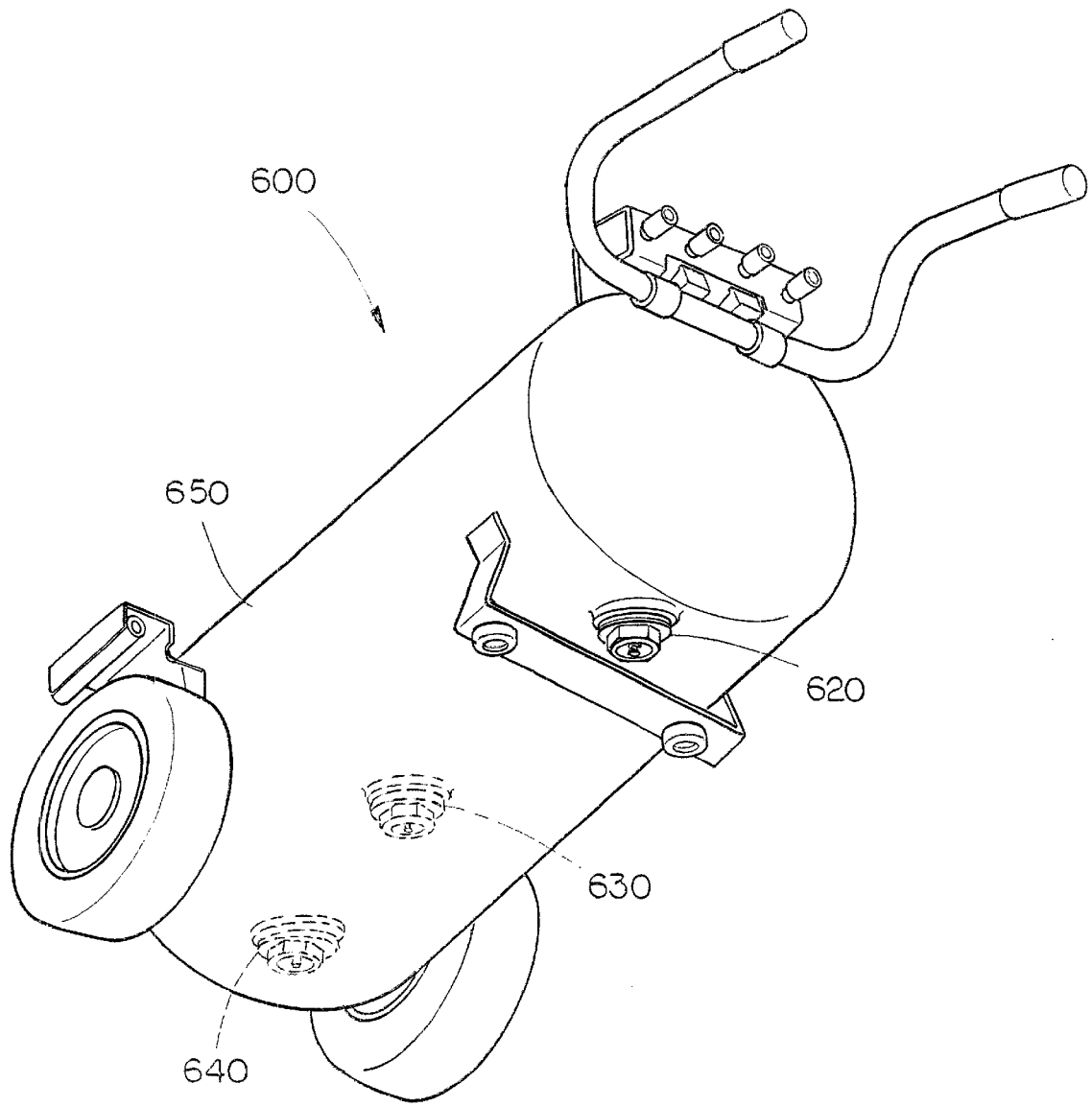
FIG. 6 depicts exemplary positions the condensate removal device may be placed on an air tank.

Referring now to FIG. 6, the placement of the condensate removal device need not be in the center of the air tank. For example, in exemplary embodiments 600 the condensate removal device may be placed near the bracket 620, in the middle 630, and near the wheels 640 along with areas in between the front and end of the air tank 650. Also, it should be noted that the present invention is not limited to a single style of air tank as the condensate removal protection apparatus may be utilized in all types of air tanks. An exemplary middle location 630 may be preferred as inspections made on the air tank may be made easier with a hole located in the center of the air tank on the bottom side and a hole in the center of the air tank on the top side. Typically, a check valve may be placed in the center of the air tank on the top side. With these two locations, an thorough inspection of the inside of air tank is possible to check for wear and corrosion. In all of the locations regarding placement of the condensate removal device, exemplary supports as shown in FIGS. 2–4 may be incorporated with the condensate removal device.

Figure 7A:
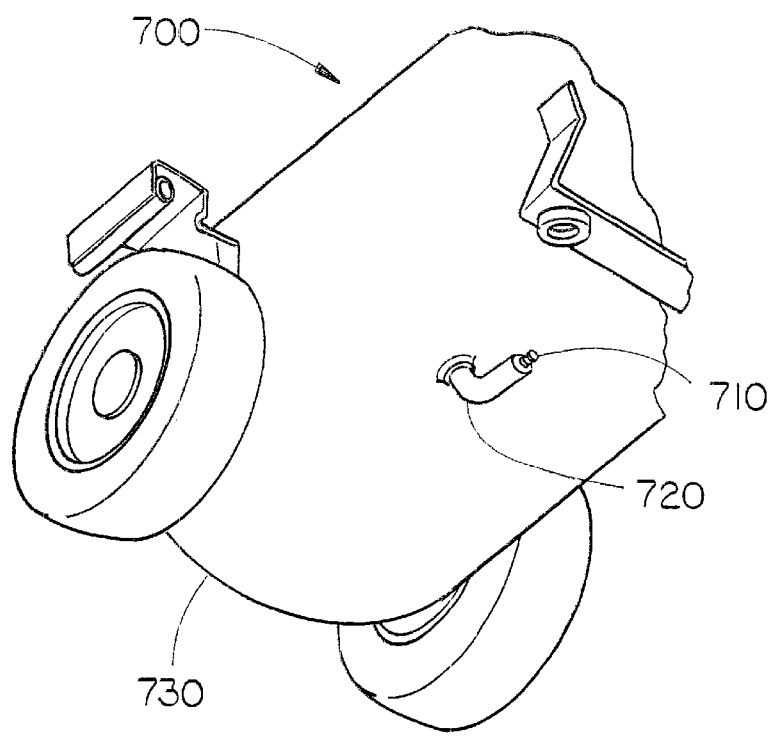
FIG. 7A depicts an additional exemplary embodiment of the condensate removal protection apparatus of the present invention.
Figure 7B:
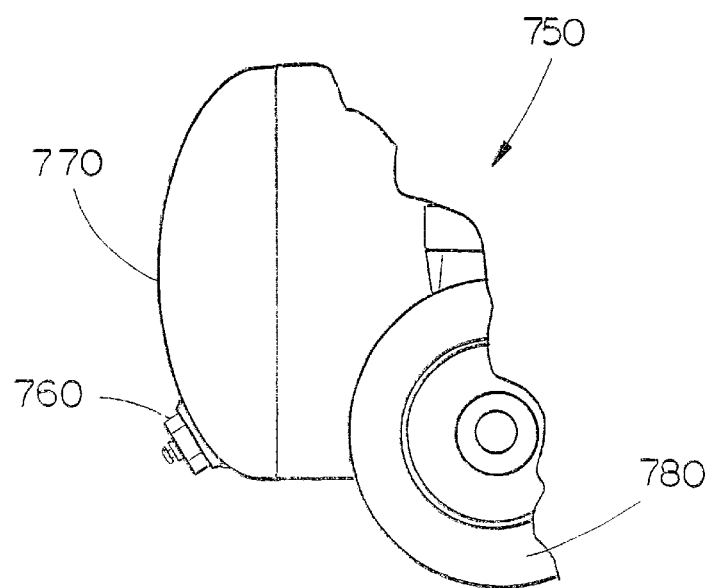
FIG. 7B depicts an another additional exemplary embodiment of the condensate removal protection apparatus placed on a side of an air tank.

Further, in another exemplary embodiment 700 the condensate removal device 710 may be attached to a tube 720 that is connected to an air tank 730 as shown in FIG. 7A. This may reduce the distance that the condensate removal device 710 protrudes outwardly from the air tank 730. In another exemplary embodiment 750, the condensate removal device 760 may be placed on a side of an air tank 770. As shown in FIG. 7A, the condensate removal device may be placed on a side close to the wheels 780. In order to remove condensate from an air tank 770, lifting of the front of the air tank 770 may be required. Different embodiments may be available to a person with ordinary skill in the art in order to protect a condensate removal device from contact from foreign objects that do not depart from the scope and spirit of the present invention.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A condensate removal protection apparatus, comprising:
   (a) an air tank;
   (b) an opening in said air tank;
   (c) a mounting assembly connected to said air tank surrounding said opening; and
   (d) a removable closure covering said opening suitable for maintaining said air tank in a pressurized condition when closed, wherein condensate may be removed from said air tank by opening said removable closure and wherein said removable closure is recessed within said mounting assembly suitable for protecting said removable closure from contact with foreign objects.

2. The condensate removal protection apparatus as claimed in claim 1, wherein said removable closure is a valve.

3. The condensate removal protection apparatus as claimed in claim 1, further comprising a support located in proximity to said removable closure suitable for further protecting said removable closure from contact with foreign objects.

4. The condensate removal protection apparatus as claimed in claim 3, wherein said support comprises at least one of metal, plastic, fiberglass, and wood.

5. The condensate removal protection apparatus as claimed in claim 3, wherein said support surrounds said removable closure.

6. The condensate removal protection apparatus as claimed in claim 5, further comprising a cap connected to said support suitable for enclosing said opening and said removable closure.

7. The condensate removal protection apparatus as claimed in claim 6, wherein said opening and said removable closure are suitable for placement in an area that fluid may be drained from said air tank.

8. The condensate removal protection apparatus as claimed in claim 1, wherein said mounting assembly comprises a weld flange and a threaded plug.

9. A compressed air assembly, comprising:
   (a) an air tank;
   (b) a mounting assembly connected to said air tank; and
   (c) a valve connected to said mounting assembly suitable for draining fluids out of said air tank, wherein said valve is recessed in said mounting assembly suitable for protecting said valve from contact with foreign objects.

10. The compressed air assembly as claimed in claim 9, further comprising a support located in proximity to said valve suitable for further protecting said valve from contact with foreign objects.

11. The compressed air assembly as claimed in claim 10, wherein said support comprises at least one of metal, plastic, fiberglass and wood.

12. The compressed air assembly as claimed in claim 10, wherein said support surrounds said valve.

13. The compressed air assembly as claimed in claim 12, further comprising a cap connected to said support suitable for enclosing said valve.

14. The compressed air assembly as claimed in claim 13, wherein said valve is suitable for placement in an area that fluid may be drained from said air tank.

15. The compressed air assembly as claimed in claim 9, wherein said mounting assembly comprises a weld flange and a threaded plug.

16. A method of durable condensate removal, comprising the following steps:
   (a) placing a hole in an air tank near a lowpoint of said air tank;
   (b) connecting a mounting assembly to said air tank around said hole;
   (c) recessing a condensate removal device comprising a removable closure within said mounting assembly; and
   (d) shielding said condensate removal device with a support, wherein condensate may be removed by opening said removable closure of said condensate removal device and wherein said support and said mounting assembly avert damage to said condensate removal device by preventing said condensate removal device from coming into contact with a foreign object.

17. The method as claimed in claim 16, wherein said condensate removal device is a valve.

18. The method as claimed in claim 16, wherein said support surrounds said condensate removal device.

19. The method as claimed in claim 18, further comprising a cap connected to said support suitable for enclosing said opening and said condensate removal device.

20. The method as claimed in claim 16, wherein said support comprises at least one of metal, plastic, fiberglass and wood.

21. The method as claimed in claim 16, wherein said lowpoint of said air tank is suitable for repositioning through movement of said air tank.

22. The method as claimed in claim 16, wherein said mounting assembly comprises a weld flange and a threaded plug.

* * * * *